United States Patent
Challener et al.

(10) Patent No.: US 7,805,765 B2
(45) Date of Patent: *Sep. 28, 2010

(54) EXECUTION VALIDATION USING HEADER CONTAINING VALIDATION DATA

(75) Inventors: David C. Challener, Raleigh, NC (US); Daryl C. Cromer, Apex, NC (US); Howard J. Locker, Cary, NC (US); David R. Safford, Brewster, NY (US); Randall S. Springfield, Chapel Hill, NC (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 175 days.

This patent is subject to a terminal disclaimer.

(21) Appl. No.: 11/319,329

(22) Filed: Dec. 28, 2005

(65) Prior Publication Data

US 2006/0185017 A1 Aug. 17, 2006

Related U.S. Application Data

(63) Continuation-in-part of application No. 11/024,914, filed on Dec. 28, 2004, now Pat. No. 7,752,667.

(51) Int. Cl.
*G06F 11/00* (2006.01)
*G06F 12/14* (2006.01)
*G06F 12/16* (2006.01)

(52) U.S. Cl. .................. 726/26; 726/23; 726/24

(58) Field of Classification Search .......... 726/22–25; 713/150–187
See application file for complete search history.

(56) References Cited

U.S. PATENT DOCUMENTS

| | | | |
|---|---|---|---|
| 5,734,819 A | 3/1998 | Lewis | |
| 5,903,732 A | 5/1999 | Reed et al. | |
| 6,021,510 A | 2/2000 | Nachenberg | |
| 6,049,874 A | 4/2000 | McClain et al. | |
| 6,094,731 A | 7/2000 | Waldin et al. | |
| 6,209,090 B1 | 3/2001 | Aisenberg et al. | |
| 6,269,456 B1 * | 7/2001 | Hodges et al. | 714/38 |
| 6,289,462 B1 | 9/2001 | McNabb et al. | |
| 6,292,900 B1 | 9/2001 | Ngo et al. | |
| 6,374,266 B1 * | 4/2002 | Shnelvar | 707/204 |
| 6,393,420 B1 | 5/2002 | Peters | |
| 6,611,925 B1 | 8/2003 | Spear | |
| 6,640,305 B2 | 10/2003 | Kocher et al. | |
| 6,694,434 B1 * | 2/2004 | McGee et al. | 713/189 |

(Continued)

*Primary Examiner*—Michael Pyzocha
*Assistant Examiner*—Luu Pham
(74) *Attorney, Agent, or Firm*—Fox Rothschild LLP

(57) ABSTRACT

Executable files are extended with a file signature containing a header containing validation data. This header may be added to an existing executable and linking format (ELF) header, added as a new section, or placed in a file's extended attribute store. The header contains results of all previous validation checks that have been performed. The file signature is inserted, with a date stamp, into the file attributes. On execution, the system checks the previously-created file signature against a current file signature, instead of creating the file signature for every file during the execution process. Checks to ensure that the file signature is secure, and is valid and up to date, are also implemented. Only if the file signature is not valid and up-to-date does the execution program create a new file signature at the time of execution.

6 Claims, 2 Drawing Sheets

U.S. PATENT DOCUMENTS

| | | |
|---|---|---|
| 6,735,700 B1 | 5/2004 | Flint et al. |
| 6,848,048 B1 * | 1/2005 | Holmes ................... 713/162 |
| 6,968,058 B1 * | 11/2005 | Kondoh et al. ............ 380/200 |
| 7,010,689 B1 * | 3/2006 | Matyas et al. ............. 713/168 |
| 7,013,392 B1 * | 3/2006 | Sasaki et al. .............. 713/187 |
| 7,069,594 B1 * | 6/2006 | Bolin ........................ 726/26 |
| 2001/0020272 A1 | 9/2001 | LePennec et al. |
| 2001/0056533 A1 | 12/2001 | Yianilos et al. |
| 2002/0016925 A1 | 2/2002 | Pennec et al. |
| 2002/0062439 A1 | 5/2002 | Cotugno et al. |
| 2002/0062451 A1 | 5/2002 | Scheidt et al. |
| 2002/0174349 A1 | 11/2002 | Wolff et al. |
| 2003/0120939 A1 * | 6/2003 | Hughes et al. ............. 713/191 |
| 2003/0149887 A1 * | 8/2003 | Yadav ....................... 713/200 |
| 2003/0200402 A1 | 10/2003 | Willman et al. |
| 2003/0216172 A1 * | 11/2003 | LeMay et al. .............. 463/29 |
| 2004/0025015 A1 * | 2/2004 | Satterlee et al. ........... 713/164 |
| 2004/0059936 A1 * | 3/2004 | Wakao et al. .............. 713/200 |
| 2004/0098599 A1 * | 5/2004 | Bentley ..................... 713/187 |
| 2004/0133548 A1 * | 7/2004 | Fielding et al. ............. 707/1 |
| 2004/0172551 A1 * | 9/2004 | Fielding et al. ............ 713/200 |
| 2005/0015599 A1 * | 1/2005 | Wang et al. ................ 713/176 |
| 2005/0021971 A1 * | 1/2005 | Patankar et al. ............ 713/176 |
| 2005/0071633 A1 * | 3/2005 | Rothstein .................. 713/167 |
| 2005/0081053 A1 | 4/2005 | Aston et al. |
| 2005/0108240 A1 | 5/2005 | Bolosky et al. |
| 2005/0114338 A1 * | 5/2005 | Borthakur et al. .......... 707/9 |
| 2005/0114658 A1 | 5/2005 | Dye et al. |
| 2005/0132206 A1 | 6/2005 | Palliyil et al. |
| 2005/0182958 A1 * | 8/2005 | Pham et al. ................ 713/200 |
| 2005/0193217 A1 * | 9/2005 | Case et al. ................. 713/200 |
| 2005/0198507 A1 | 9/2005 | Brender et al. |
| 2005/0240781 A1 * | 10/2005 | Gassoway .................. 713/188 |
| 2007/0150948 A1 | 6/2007 | De Spiegeleer |
| 2008/0195583 A1 * | 8/2008 | Hsu et al. ................... 707/3 |

* cited by examiner

EXECUTION VALIDATION USING HEADER CONTAINING VALIDATION DATA

CROSS-REFERENCE TO RELATED APPLICATIONS

This application is a continuation-in-part (CIP) of U.S. application Ser. No. 11/024,914, filed Dec. 28, 2004, the contents of which are fully incorporated herein by reference.

BACKGROUND OF THE INVENTION

1. Field of the Invention

This invention relates to validation of executable files.

2. Description of the Related Art

Among all computing and networking security issues, the most important cause of concern does not come from intrusions, but from the widespread proliferation of viruses. Viral infections represent the great majority of all security incidents and consume massive amounts of time and resources in their detection and in correcting problems associated with the execution of undetected viruses on a system.

In their most basic form, viruses and other unwanted programming instructions manifest themselves in unwanted code and/or programs inserted into files that executed on a computer system. The various manners in which such unwanted instructions are copied into computer systems are well known and are thus not discussed further herein.

To combat the problem of viruses and other unwanted code finding their way onto and executing on computer systems, virus scan programs have been developed to identify the existence of viruses on a system. In addition, executable programs have been developed which are digitally signed, whereby a kernel checks the digital signature each time the executable file is to be run, refusing to allow it to run if the signature is not valid.

Virus scan programs have been developed to identify the existence of viruses on a system. Each file on a computer system is scanned and a check sum or hash value (or simply "hash") is created for each file. A hash, also called a message digest, is a number generated from a string of text. The hash is substantially smaller than the text itself, and is generated by a formula in such a way that is extremely unlikely that some other text will produce the same hash value. Hashes play a role in security systems where they are used to ensure that transmitted messages have not been tampered with. The sender generates a hash of the message, encrypts it, and sends it with the message itself. The recipient then decrypts both the message and the hash, produces another hash from the received message, and compares the two hashes. If they are the same, there is a high probability that the message was transmitted intact. The concept of hashing is well known and is not discussed further herein.

The file name and the hash value are compared to a virus signature file which contains information regarding all known viruses as of the date the virus scan program was last updated. If a match is found (i.e., if the file name, or elements of the file itself (it's hash matches a known virus hash), correspond to the name or elements of a known virus), the file containing the match is quarantined and rendered inoperable, repaired, or deleted. The virus signature files are updated periodically, e.g., weekly or more frequently if needed as new virus files are discovered. This requires users to run a complete virus scan on all files each time the virus signature files are updated.

Virus scan programs take a long time to perform their scanning and checking process. For each 10 Gigabytes of memory, it can take approximately 30 minutes to complete a scan and check operation. As the size of hard drives increase, and with the increase in size of software images due to multimedia content, such as MP3 and digital pictures, the problem of increased scan time is only getting worse. The scanning operation itself uses significant system resources and thus delays other operations that a user is attempting to perform. Further, with the proliferation of mobile laptop devices, it is often impossible to schedule virus scans during off hours, as can be done with desktop systems that are never turned off, since laptop systems are typically turned off when not in operation.

The digital signatures on the executables can be of two types: symmetric or asymmetric. A symmetric signature uses a secret key to key a message authentication code (MAC), taken across the entire content of the executable file. Symmetric signatures can be verified with relatively little overhead, but the key must remain secret, or the attacker can forge valid signatures. This makes symmetric signatures useful only in the local case. In addition, the key must be kept secret on the local machine, and this is very difficult to do.

An asymmetric signature uses a public key signature pair, such as with the RSA signature scheme. In this case the private key is used to sign, and the public key is used to verify the signature. The private key needs to remain secret, but need exist only on the signing system. All other systems can verify the signature knowing only the public key, which need not be secret. Thus executables signed with asymmetric signatures are muc more flexible, as the signed executable can be widely distributed, while the signing remains centralized. Unfortunately, public key signature verification have much higher overhead than symmetric ones.

Accordingly, it would be desirable to have a system and method for decreasing the time and overhead associated with verifying executable files.

SUMMARY OF THE INVENTION

The present invention adds a procedure to the operating system file subsystem of a processing system that significantly reduces the amount of time necessary to verify the validity of executable files. Each executable is extended with a file signature containing a header containing validation data. This header may be added to an existing executable and linking format (ELF) header, added as a new section, or placed in a file's extended attribute store. The header contains results of all previous verification checks that have been performed. The file signature is inserted, with a date stamp, into the file attributes. On execution, the system checks the previously-created file signature against a current file signature, instead of creating the file signature for every file during the execution process. Checks to ensure that the file signature is secure, and is valid and up to date, are also implemented. Only if the file signature is not valid and up-to-date does the execution program create a new file signature at the time of execution.

DETAILED DESCRIPTION OF THE PREFERRED EMBODIMENTS

Figure 1:
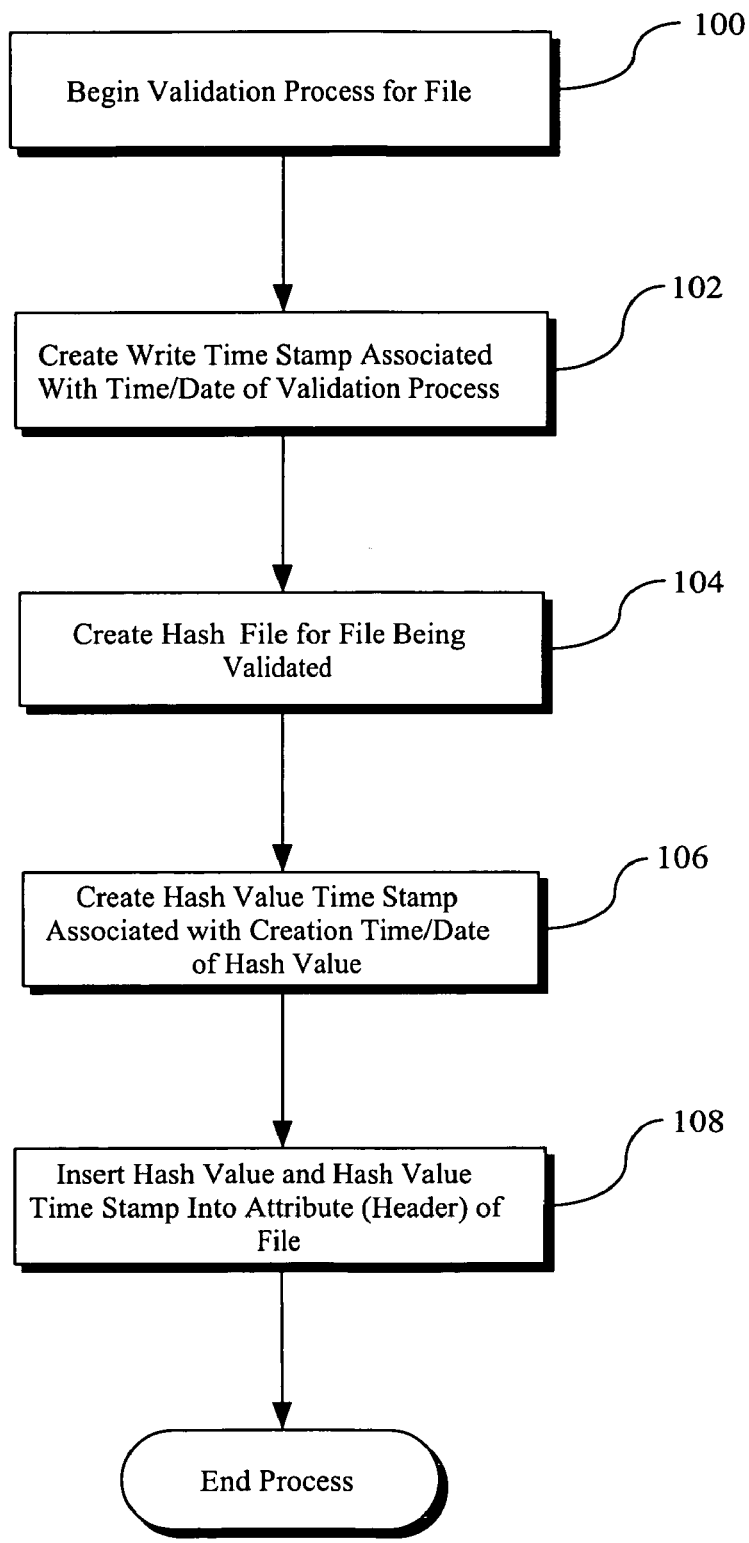
FIG. 1 is a flowchart illustrating an example of the basic steps utilized to create a file signature correlated to the creation of a hash value when a file is being written to, in accordance with the present invention.

FIG. 1 is a flowchart illustrating an example of the basic steps utilized to create a file signature correlated to the creation of a hash value when a file is being executed, in accordance with the present invention. At step 100, the process begins for executing an executable file. All previous validation methods are performed at this time, and the results of this check are inserted into a validation header, along with a hash of the file, and the MAC of the header. At step 102, a "validation timestamp" associated with the time and date at which the validation process is performed, is created.

At step 104, a hash value is created for the file being validated at essentially the same time as the validation process has been completed. To avoid problems with slight delays between the actual time that the validation process completes and the actual time that the creation of the hash value is completed, a predetermined +/− factor can be applied when making comparisons described below.

At step 106, a hash value timestamp is created associated with the creation time and date of the hash value. At step 108, the hash value itself, along with the hash value timestamp are inserted into the attribute (header) of the file that was just written to. The process is then completed.

Figure 2:
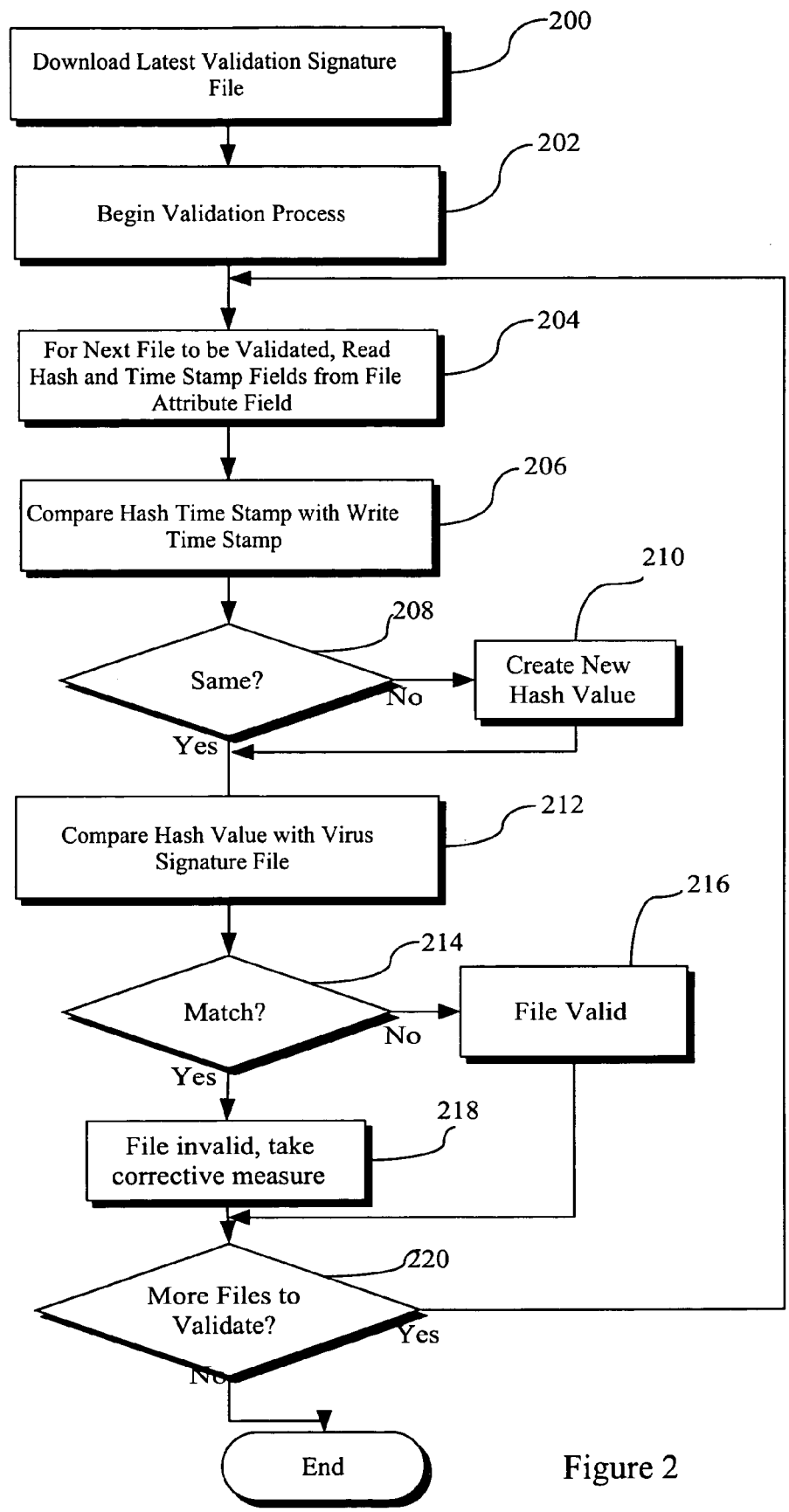
FIG. 2 illustrates an example of steps performed, in accordance with the present invention, when executing a file containing the novel file signature.

FIG. 2 illustrates an example of steps performed, in accordance with the present invention, when executing a file containing the novel signature of the present invention.

At step 200, the latest validation signature file(s) are downloaded for use by the execution software. As is well known, this assures that the validation process is performed using the most currently available validation definitions and other related files.

At step 202, the validation process commences. At step 204, for the next file on the hard drive to be read, the hash and timestamp fields, are read from the file. At step 206, the hash timestamp is compared with the write timestamp to make sure that neither the hash value nor the file being scanned have changed since the last valid write of the file. This protects against a "smart virus" that can insert itself into a file after the valid write to the drive has been completed. Essentially, this assures that the file has not been changed since the hash value and hash value timestamp were inserted into the header field.

At step 208, if it is determined that the hash timestamp and the write timestamp are different (or are not within the +/− factor indicated above), then a new hash value is created on the fly, prior to proceeding to step 212. If, however, at step 208 it is determined that the hash timestamp and the write timestamp are the same (or essentially the same), the process proceeds directly to step 212.

At step 212, the hash value is compared with the validation signature file in a well known manner to determine if there are any "matches" indicating the existence of validation-related elements in the hash value. If, at step 214, there are no matches found, the file is determined to be valid at step 216, and the process proceeds directly to step 220.

However, if, at step 214, it is determined that there is a match between the hash value and the validation signature file, this indicates the presence of a contamination or invalid file of some kind, and the process proceeds to step 218 where the invalidity is acknowledged and corrective measures are taken in a well known manner. The process then proceeds to step 220, where it is determined if there are more files to be validated. If, at step 220, it is determined that there are more files to be validated, the process proceeds back to step 204 where the above steps are again performed. If, at step 220, it is determined that there are no more files to be validated, the process ends.

As noted above, using the present invention, the operating system file of a computer system is modified to create the hash during each file write. This hash is timestamped and may be encoded with a security chip such as the Trusted Platform Module or any other well known industry crypto processor. The security chip contains a monotonic counter (can only count forward, never can be reset or pulled backwards) which is used within the well known algorithm to create the timestamp. This prevents an intelligent virus from creating an incorrect timestamp.

Using the present invention, the validation process, which is extremely time-consuming, is performed on a file-by-file basis, whenever the file is executed. This spreads out the creation of hash values over the course of the use of the computer, rather than at a specific point in time when a file execution is being performed. A digital signature (hash) is created and stored within each file attribute, which are stored in the header field in front of the actual data. The hash represents the file signature, the Trusted Platform Module (TPM) or security chip then encrypts the hash with the monotonic counter to timestamp it. The write is also timestamped and encrypted. This way, a smart virus cannot fake any of this data.

When the verification process is performed, in most cases the majority of the files will have a write timestamp and hash timestamp that match, indicating that the stored hash table can be used for the verification process. Accordingly, at the time of running the verification process, most of the time will be consumed comparing the hash table to the verification definitions rather than creating the hash tables.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation located on a hard drive, flash memory, etc. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1-2 support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A machine-implemented method, comprising:
   performing a validation check and creating a file signature for each execution process associated with a computer file; wherein said file signature comprises a header, a message authentication code, a hash value, a hash value time stamp corresponding to the time that the hash value was created, and a write time stamp corresponding to the time the validation check was completed; and wherein the header includes the results of the validation check;
   during a subsequent validation operation performed by the validation program on the computer file, comparing the hash value time stamp with the write time stamp;
   comparing the previously-created file signature with a validation signature during said validation operation in response to the write time stamp matching the hash value time stamp within a predetermined criterion and determining if the computer file is invalid or valid based on the comparison of the previously-created file signature with the validation signature;
   creating a new hash value and updating the previously-created file signature to include the new hash value only in response to the write time stamp not matching the hash value time stamp within the predetermined criterion, and retaining the hash value in the previously-created file signature only in response to the write time stamp matching the hash value time stamp within the predetermined criterion; and
   comparing the updated file signature with the validation signature during the validation operation in response to the write time stamp not matching the hash value time stamp within the predetermined criterion, and determining if the computer file is invalid or valid based on the comparison of the updated file signature with the validation signature.

2. The method of claim 1, wherein:
   determining if the computer file is invalid or valid based on the comparison of the previously-created file signature with the validation signature comprises:
      in response to the hash value in the previously-created file signature of said computer file matching one or more elements of said validation signature, making a determination that that computer file is invalid; and
      in response to the hash value in the previously-created file signature of said computer file not matching one or more elements of said validation signature, making a determination that that computer file is valid; and
   determining if the computer file is invalid or valid based on the comparison of the updated file signature with the validation signature comprises:
      in response to the new hash value of said computer file matching one or more elements of said validation signature, making a determination that that computer file is invalid; and
      in response to the new hash value of said computer file not matching one or more elements of said validation signature, making a determination that that computer file is valid.

3. A system, comprising:
   a processor; and
   a memory storing computer-executable instructions that, when executed by the processor, cause the processor to perform the steps of:
      performing a validation check and creating a file signature for each execution process associated with a computer file; wherein said file signature comprises a header, a message authentication code, a hash value, a hash value time stamp corresponding to the time that the hash value was created, and a write time stamp corresponding to the time the validation check was completed; and wherein the header includes the results of the validation check;
      during a subsequent validation operation performed by the validation program on the computer file, comparing the hash value time stamp with the write time stamp;
      comparing the previously-created file signature with a validation signature during said validation operation in response to the write time stamp matching the hash value time stamp within a predetermined criterion and determining if the computer file is invalid or valid based on the comparison of the previously-created file signature with the validation signature;
      creating a new hash value and updating the previously-created file signature to include the new hash value only in response to the write time stamp not matching the hash value time stamp within the predetermined criterion, and retaining the hash value in the previously-created file signature only in response to the write time stamp matching the hash value time stamp within the predetermined criterion; and
      comparing the updated file signature with the validation signature during the validation operation in response to the write time stamp not matching the hash value time stamp within the predetermined criterion, and determining if the computer file is invalid or valid based on the comparison of the updated file signature with the validation signature.

4. The system of claim 3, wherein
   determining if said computer file is invalid or valid based on said comparison of the previously-created file signature and the validation signature comprises:
      in response to the hash value in the previously-created file signature of said computer file matching one or more elements of said validation signature, making a determination that the computer file is invalid; and
      in response to the hash value in the previously-created file signature of said computer file not matching one or more elements of said validation signature, making a determination that that computer file is valid; and
   determining if an invalid executable file exists in said computer file based on said comparison of the updated file signature and the validation signature comprises:
      in response to the new hash value of said computer file matching one or more elements of said validation signature, making a determination that the computer file is invalid; and
      in response to the new hash value of said computer file not matching one or more elements of said validation signature, making a determination that the computer file is valid.

5. A non-transitory computer-readable storage medium having computer-readable program code embodied in the medium that, when executed by a processor, causes the processor to perform the steps of:

performing a validation check and creating a file signature for each execution process associated with a computer file; wherein said file signature comprises a header, a message authentication code, a hash value, a hash value time stamp corresponding to the time that the hash value was created, and a write time stamp corresponding to the time the validation check was completed; and wherein the header includes the results of the validation check;

during a subsequent validation operation performed by the validation program on the computer file, comparing the hash value time stamp with the write time stamp;

comparing the previously-created file signature with a validation signature during said validation operation in response to the write time stamp matching the hash value time stamp within a predetermined criterion and determining if the computer file is invalid or valid based on the comparison of the previously-created file signature with the validation signature;

creating a new hash value and updating the previously-created file signature to include the new hash value only in response to the write time stamp not matching the hash value time stamp within the predetermined criterion, and retaining the hash value in the previously-created file signature only in response to the write time stamp matching the hash value time stamp within the predetermined criterion; and comparing the updated file signature with the validation signature during the validation operation in response to the write time stamp not matching the hash value time stamp within the predetermined criterion, and determining if the computer file is invalid or valid based on the comparison of the updated file signature with the validation signature.

6. The non-transitory computer-readable storage medium of claim 5, wherein:

determining if said computer file is invalid or valid based on said comparison of the previously-created file signature and the validation signature comprises:

in response to the hash value in the previously-created filed signature of said computer file matching one or more elements of said validation signature, making a determination that that computer file is invalid; and in response to the hash value in the previously-created filed signature of said computer file not matching one or more elements of said validation signature, making a determination that that computer file is valid; and determining if said computer file is invalid or valid based on said comparison of the updated file signature and the validation signature comprises:

in response to the new hash value of said computer file matching one or more elements of said validation signature, making a determination that that computer file is invalid; and in response to the new hash value of said computer file not matching one or more elements of said validation signature, making a determination that that computer file is valid.

* * * * *